United States Patent
Vrhel, Jr. et al.

(10) Patent No.: US 6,598,223 B1
(45) Date of Patent: Jul. 22, 2003

(54) METHOD AND SYSTEM FOR INSTALLING AND TESTING BUILD-TO-ORDER COMPONENTS IN A DEFINED CONFIGURATION COMPUTER SYSTEM

(75) Inventors: Thomas Vrhel, Jr., Austin, TX (US); Gaston M. Barajas, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/413,463

(22) Filed: Oct. 6, 1999

(51) Int. Cl.[7] .............................................. G06F 9/455
(52) U.S. Cl. ...................... 717/174; 717/168; 717/174; 717/178
(58) Field of Search ................................ 717/174, 121, 717/172, 177, 122, 168, 170, 171, 176, 120, 202, 520

(56) References Cited

U.S. PATENT DOCUMENTS

| | | | |
|---|---|---|---|
| 4,253,178 A | 2/1981 | Kolaczia | 368/285 |
| 4,356,545 A | 10/1982 | West | 364/200 |
| 4,438,458 A | 3/1984 | Munscher | 358/254 |
| 4,491,914 A | 1/1985 | Sujaku | 364/200 |
| 4,627,060 A | 12/1986 | Huang et al. | 371/62 |
| 4,635,187 A | 1/1987 | Baron et al. | 364/200 |

(List continued on next page.)

FOREIGN PATENT DOCUMENTS

| | | | |
|---|---|---|---|
| GB | 2065939 | 7/1981 | G06F/11/30 |
| GB | 2329266 | 3/1999 | G06F/11/00 |
| GB | 2356271 | 5/2001 | G06F/11/00 |
| WO | WO 93/00628 | 1/1993 | G06F/1/24 |
| WO | WO 94/08289 | 4/1994 | G06F/9/445 |
| WO | WO 97/09676 | 3/1997 | |
| WO | WO 98/18086 | 4/1998 | |

OTHER PUBLICATIONS

Wilson et al, Knowledge based interface to manufacturing computer system, ACM pp 1183–1189, 1988.*
Green, "Component based software development: implications for documentation", ACM pp 159–164, 1999.*
Hall et al, "A cooperative approach to support software deployment using software dock", ACM ICSE, pp 174183, 1999.*

(List continued on next page.)

*Primary Examiner*—Anil Khatri
(74) *Attorney, Agent, or Firm*—Baker Botts L.L.P.

(57) ABSTRACT

A computer system manufacturing process is disclosed in which a customer may order a computer system having one of several defined or base configurations of hardware and software components. After specifying the base configuration of hardware and software components, the user may identify custom hardware or software components to be added to the system. During the manufacturing process, the computer system accesses a network for retrieving a data record of the customer order and downloading the software of the computer system. The software to be downloaded will include the software of the base configuration and any custom software. Following the installation of the custom hardware and software components, the computer system will be tested to evaluate the function of the system components and the integration of the custom components and the components of the base configuration. Following a successful test, test software and networking software are removed from the computer system before the operating system of the computer system is resealed and the computer system is shipped to the customer.

30 Claims, 2 Drawing Sheets

U.S. PATENT DOCUMENTS

| | | | |
|---|---|---|---|
| 4,788,658 A | 11/1988 | Hanebuth | 364/900 |
| 4,809,280 A | 2/1989 | Shonaka | 371/62 |
| 4,916,699 A | 4/1990 | Ohashi | 364/900 |
| 4,964,077 A | 10/1990 | Eisen et al. | 364/900 |
| 5,010,551 A | 4/1991 | Goldsmith et al. | 371/16.4 |
| 5,017,030 A | 5/1991 | Crews | 400/485 |
| 5,060,135 A | 10/1991 | Levine et al. | 364/200 |
| 5,196,993 A | 3/1993 | Herron et al. | 361/393 |
| 5,214,695 A | 5/1993 | Arnold et al. | 380/4 |
| 5,224,024 A | 6/1993 | Tu et al. | |
| 5,228,655 A | 7/1993 | Garcia et al. | 248/118 |
| 5,276,805 A | 1/1994 | Hamaguchi | 395/164 |
| 5,287,448 A | 2/1994 | Nicol et al. | 395/159 |
| 5,287,505 A | 2/1994 | Calvert et al. | 395/600 |
| 5,325,521 A | 6/1994 | Koyama et al. | 375/575 |
| 5,346,410 A | 9/1994 | Moore, Jr. | 439/607 |
| 5,348,408 A | 9/1994 | Gelardi et al. | 400/715 |
| 5,355,357 A | 10/1994 | Yamamori et al. | 369/75.2 |
| 5,356,099 A | 10/1994 | Sereboff | 248/118.1 |
| 5,367,667 A | 11/1994 | Wahlquist et al. | 395/575 |
| 5,374,018 A | 12/1994 | Daneshvar | 248/118 |
| 5,375,800 A | 12/1994 | Wilcox et al. | 248/118 |
| 5,381,526 A | 1/1995 | Ellson | 395/164 |
| 5,388,032 A | 2/1995 | Gill et al. | 364/146 |
| 5,390,324 A | 2/1995 | Burckhartt et al. | 395/575 |
| 5,392,095 A | 2/1995 | Siegel | 355/200 |
| 5,398,333 A | 3/1995 | Schieve et al. | 395/575 |
| 5,410,447 A | 4/1995 | Miyagawa et al. | 361/681 |
| 5,422,751 A | 6/1995 | Lewis et al. | 359/83 |
| 5,423,605 A | 6/1995 | Liu | 312/265.6 |
| 5,432,927 A | 7/1995 | Grote et al. | 395/575 |
| 5,443,237 A | 8/1995 | Stadtmauer | 248/441.1 |
| 5,450,576 A | 9/1995 | Kennedy | 395/650 |
| 5,454,080 A | 9/1995 | Fasig et al. | 395/283 |
| 5,455,933 A | 10/1995 | Schieve et al. | 395/183.03 |
| 5,471,674 A | 11/1995 | Stewart et al. | 395/650 |
| 5,483,437 A | 1/1996 | Tang | 363/146 |
| 5,503,484 A | 4/1996 | Louis | 400/489 |
| 5,513,319 A | 4/1996 | Finch et al. | 395/185.08 |
| 5,522,572 A | 6/1996 | Copeland et al. | 248/118 |
| 5,526,180 A | 6/1996 | Rausnitz | 359/609 |
| 5,530,847 A | 6/1996 | Schieve et al. | 395/183.14 |
| 5,537,585 A | 7/1996 | Blickenstaff et al. | 395/600 |
| 5,537,618 A | 7/1996 | Boulton et al. | 395/161 |
| 5,547,154 A | 8/1996 | Kirchoff et al. | 248/118.3 |
| 5,547,272 A | 8/1996 | Paterson et al. | 312/223.2 |
| 5,564,054 A | 10/1996 | Bramnick et al. | 395/700 |
| 5,592,362 A | 1/1997 | Ohgami et al. | 361/686 |
| 5,596,481 A | 1/1997 | Liu et al. | 361/683 |
| 5,596,482 A | 1/1997 | Horikoshi | 361/683 |
| 5,627,964 A | 5/1997 | Reynolds et al. | 395/183.22 |
| 5,649,200 A * | 7/1997 | Leblang et al. | 717/122 |
| 5,668,992 A | 9/1997 | Hammer et al. | 395/651 |
| 5,678,002 A | 10/1997 | Fawcett et al. | 395/183.01 |
| 5,680,640 A | 10/1997 | Ofek et al. | 395/839 |
| 5,689,253 A | 11/1997 | Hargreaves et al. | 341/22 |
| 5,689,706 A | 11/1997 | Rao et al. | 395/617 |
| 5,694,293 A | 12/1997 | Seto et al. | 361/687 |
| 5,708,776 A | 1/1998 | Kikinis | 395/185.08 |
| 5,708,812 A | 1/1998 | Van Dyke et al. | 395/712 |
| 5,724,224 A | 3/1998 | Howell et al. | 361/680 |
| 5,727,163 A | 3/1998 | Bezos | 395/227 |
| 5,732,268 A | 3/1998 | Bizzarri | 395/652 |
| 5,748,877 A | 5/1998 | Dollahite et al. | 395/183.12 |
| 5,759,644 A | 6/1998 | Stanley | 428/14 |
| 5,768,370 A | 6/1998 | Maatta et al. | 379/433 |
| 5,775,822 A | 7/1998 | Cheng | 400/489 |
| 5,778,372 A | 7/1998 | Cordell et al. | 707/100 |
| 5,790,796 A | 8/1998 | Sadowsky | 395/200.51 |
| 5,796,579 A | 8/1998 | Nakajima et al. | 361/683 |
| 5,797,281 A | 8/1998 | Fox | 63/12 |
| 5,803,416 A | 9/1998 | Hanson et al. | 248/118 |
| 5,805,882 A | 9/1998 | Cooper et al. | 395/652 |
| 5,809,248 A | 9/1998 | Vidovic | 395/200.49 |
| 5,809,511 A | 9/1998 | Peake | 707/204 |
| 5,818,635 A | 10/1998 | Hohn et al. | 359/612 |
| 5,819,274 A | 10/1998 | Jackson, Jr. | 707/10 |
| 5,825,355 A | 10/1998 | Palmer et al. | 345/336 |
| 5,825,506 A | 10/1998 | Bednar et al. | 358/402 |
| 5,826,839 A | 10/1998 | Chen | 248/118 |
| 5,832,522 A | 11/1998 | Blickenstaff et al. | 707/204 |
| 5,835,344 A | 11/1998 | Alexander | 361/683 |
| 5,845,136 A | 12/1998 | Babcock | 395/750.01 |
| 5,852,545 A | 12/1998 | Pan-Ratzlaff | 361/683 |
| 5,854,828 A | 12/1998 | Kocis et al. | 379/93.31 |
| 5,860,001 A | 1/1999 | Cromer et al. | 395/651 |
| 5,860,002 A | 1/1999 | Huang | 395/652 |
| 5,860,012 A | 1/1999 | Luu | 395/712 |
| 5,861,884 A | 1/1999 | Fujioka | 345/338 |
| 5,881,236 A | 3/1999 | Dickey | 395/200.51 |
| 5,884,073 A | 3/1999 | Dent | 395/652 |
| 5,894,571 A | 4/1999 | O'Connor | 395/692 |
| 5,904,327 A | 5/1999 | Cheng | 248/118.1 |
| 5,905,632 A | 5/1999 | Seto et al. | 361/683 |
| 5,906,506 A | 5/1999 | Chang et al. | 439/500 |
| 5,909,544 A | 6/1999 | Anderson, II et al. | 395/200.38 |
| 5,939,694 A | 8/1999 | Holcomb et al. | 235/381 |
| 5,953,533 A | 9/1999 | Fink et al. | 395/712 |
| 5,955,797 A | 9/1999 | Kim | 307/150 |
| 5,960,204 A | 9/1999 | Yinger et al. | 395/712 |
| 5,960,411 A | 9/1999 | Hartman et al. | 705/26 |
| 5,963,743 A * | 10/1999 | Amberg et al. | 717/174 |
| 5,974,546 A | 10/1999 | Anderson | 713/2 |
| 5,978,911 A | 11/1999 | Knox et al. | 713/1 |
| 5,983,369 A | 11/1999 | Bakoglu et al. | 714/46 |
| 5,991,543 A * | 11/1999 | Amberg et al. | 717/175 |
| 5,995,757 A * | 11/1999 | Amberg et al. | 717/175 |
| 6,006,344 A | 12/1999 | Bell, Jr. | 714/37 |
| 6,012,154 A | 1/2000 | Poisner | 714/55 |
| 6,014,744 A | 1/2000 | McKaughan et al. | 713/2 |
| 6,023,267 A | 2/2000 | Chapuis et al. | 345/327 |
| 6,029,257 A | 2/2000 | Palmer | 714/40 |
| 6,029,258 A | 2/2000 | Ahmad | 714/46 |
| 6,032,157 A | 2/2000 | Tamano et al. | 707/104 |
| 6,034,869 A | 3/2000 | Lin | 361/686 |
| 6,038,597 A | 3/2000 | Van Wyngarden | 709/219 |
| 6,047,261 A | 4/2000 | Siefert | 705/11 |
| 6,048,454 A | 4/2000 | Howell et al. | 361/686 |
| 6,049,342 A | 4/2000 | Neilson et al. | 3445/473 |
| 6,050,833 A | 4/2000 | Danzyger et al. | 439/92 |
| 6,056,136 A | 5/2000 | Taber et al. | 215/252 |
| 6,061,788 A | 5/2000 | Reynaud et al. | 713/2 |
| 6,061,810 A | 5/2000 | Potter | 714/23 |
| 6,065,136 A | 5/2000 | Kuwabara | 714/31 |
| 6,104,874 A * | 8/2000 | Branson et al. | 717/108 |
| 6,108,697 A | 8/2000 | Raymond et al. | 709/218 |
| 6,112,320 A | 8/2000 | Dien | 714/51 |
| 6,113,050 A | 9/2000 | Rush | 248/346.01 |
| 6,166,729 A | 12/2000 | Acosta et al. | 345/327 |
| 6,167,383 A | 12/2000 | Henson | 705/26 |
| 6,167,532 A | 12/2000 | Wisecup | 714/23 |
| 6,170,065 B1 | 1/2001 | Kobata et al. | 714/7 |
| 6,182,212 B1 | 1/2001 | Atkins et al. | 713/1 |
| 6,182,275 B1 * | 1/2001 | Beelitz et al. | 717/175 |
| 6,199,204 B1 * | 3/2001 | Donohue | 717/178 |
| 6,202,207 B1 | 3/2001 | Donohue | 717/11 |
| 6,226,412 B1 | 5/2001 | Schwab | 382/232 |
| 6,236,901 B1 * | 5/2001 | Goss | 700/95 |
| 6,247,126 B1 * | 6/2001 | Beelitz et al. | 713/1 |
| 6,256,620 B1 | 7/2001 | Jawahar et al. | 707/2 |
| 6,262,726 B1 | 7/2001 | Stedman et al. | 345/333 |

| | | | | |
|---|---|---|---|---|
| 6,263,215 | B1 | | 7/2001 | Patton et al. ............... 455/561 |
| 6,272,484 | B1 | | 8/2001 | Martin et al. .................. 707/1 |
| 6,279,109 | B1 | * | 8/2001 | Brundridge ..................... 713/2 |
| 6,279,125 | B1 | | 8/2001 | Klein .......................... 714/38 |
| 6,279,156 | B1 | * | 8/2001 | Amberg et al. ............. 717/124 |
| 6,298,443 | B1 | * | 10/2001 | Colligan et al. ............ 713/200 |
| 6,298,457 | B1 | | 10/2001 | Rachlin et al. ............... 714/49 |
| 6,317,316 | B1 | | 11/2001 | Bentley et al. ............. 361/681 |
| 6,331,936 | B1 | | 12/2001 | Hom et al. .................. 361/686 |
| 6,356,977 | B2 | | 3/2002 | Ofek et al. ................. 711/112 |
| 6,367,035 | B1 | | 4/2002 | White .......................... 714/40 |
| 6,385,737 | B1 | | 5/2002 | Benignus et al. ............. 714/22 |
| 6,385,766 | B1 | | 5/2002 | Doran, Jr. et al. ............ 717/11 |

OTHER PUBLICATIONS

Pending U.S. application 08/984,357, "Technique for Performing Factory Installation of Software," J. Odendahl, Dec. 3, 1997.

Pending U.S. application 09/271,581, "System and Method for Installing System Manufacturer Provided Software," A. Rao et al., Mar. 18, 1999.

Pending U.S. application 09/333,786, "Method and Apparatus for Testing Custom–configured Software/Hardware Integration in a Computer Build–To–Order Manufacturing Process," T. Vrhel, Jr. et al., Jun. 15, 1999.

Pending U.S. application 09/378,020, "Method and System for Migrating Stored Data to a Build–To–Order Computing System," E. Hubbard et al., Aug. 19, 1999.

Pending U.S. application 09/413,557, "System and Method for Providing a Computer System with a Detachable Component," O. Ozias et al., Oct. 6, 1999.

Pending U.S. application 09/413,560, "System and Method for Converting Alternating Current Into Direct Current," O. Ozias et al. Oct. 6, 1999.

Pending U.S. application 09/413,422, "Method and System for Automated Technical Support for Computers," T. Vrhel, Fr. et al., Oct. 6, 1999.

Pending U.S. application 09/413,599, "Graphical Interface, Method, and System for the Provision of Diagnostic and Support Services in a Computer System," R. Stedman et al., Oct. 6, 1999.

Pending U.S. application 09/413,523, "System and Method for Monitoring Support Activity," G. Huber, et al., Oct. 6, 1999.

Great Britain Search and Examination Report 00 19866.3, Mar. 12, 2001.

Pending patent application Ser. No. 09/236,862: Alan E. Beelitz, Richard D. Amberg; "Recoverable Software Installation Process and Apparatus for A Computer System"; Dell USA, L.P., Filed Jan. 25, 1999.

Pending patent application 09/245,148: Jeffrey N. Sloan, Tim Sullivan, David S. Springer, "*Method and Apparatus for Diagnosing and Conveying an Identification Code in Post on a Non–Booting Personal Computer*"; Dell USA, L.P., Filed Feb. 4, 1999.

Great Britain Search and Examination Report 0019866.3 Mar, 12, 2001.

* cited by examiner

METHOD AND SYSTEM FOR INSTALLING AND TESTING BUILD-TO-ORDER COMPONENTS IN A DEFINED CONFIGURATION COMPUTER SYSTEM

CROSS-REFERENCE TO RELATED APPLICATIONS

This application relates to co-pending U.S. patent application Ser. No. 08/919,959, filed on Aug. 29, 1997, entitled "Software Installation and Testing for a Build-to-order Computer System," naming Richard D. Amberg, Roger W. Wong and Michael A. Brundridge as inventors. The co-pending application is incorporated herein by reference in its entirety, and is assigned to the assignee of the present invention.

This application relates to co-pending U.S. patent application Ser. No. 08/920,773, filed on Aug. 29, 1997, entitled "Software Installation and Testing for a Build-to-order Computer System," naming Richard D. Amberg, Roger W. Wong and Michael A. Brundridge as inventors. The co-pending application is incorporated herein by reference in its entirety, and is assigned to the assignee of the present invention.

This application relates to co-pending U.S. patent application Ser. No. 08/921,438, filed on Aug. 29, 1997, entitled "Database for Facilitating Software Installation and Testing for a Build-to-suit Computer System," naming Richard D. Amberg, Roger W. Wong and Michael A. Brundrdge as inventors. The co-pending application is incorporated herein by reference in its entirety, and is assigned to the assignee of the present invention.

This application relates to co-pending U.S. patent application Ser. No. 08/984,357, filed on Dec. 3, 1997, entitled "Technique for Performing Factory Installation of Software," naming John A. Odendahl as inventor. The copending application is incorporated herein by reference in its entirety, and is assigned to the assignee of the present invention.

This application relates to co-pending U.S. patent application Ser. No. 09/169,324, filed on Oct. 9, 1998, entitled "Factory Installing Desktop Component For Active Desktop," naming James McGlothlin and Roy Stedman as inventors. The co-pending application is incorporated herein by reference in its entirety, and is assigned to the assignee of the present invention.

This application relates to co-pending U.S. patent application Ser. No. 09/236,862, filed on Jan. 25, 1999, entitled "Recoverable Software Installation Process and Apparatus for a Computer System," naming Alan E. Beelitz and Richard D. Amberg as inventors. The co-pending application is incorporated herein by reference in its entirety, and is assigned to the assignee of the present invention.

This application relates to co-pending U.S. patent application Ser. No. 09/237,760, filed on Jan. 26, 1999, entitled "A Method of Installing Software on and/or Testing a Computer System," naming Richard D. Amberg, Roger W. Wong and Michael Lynch as inventors. The co-pending application is incorporated herein by reference in its entirety, and is assigned to the assignee of the present invention.

This application relates to co-pending U.S. patent application Ser. No. 09/271,581, filed on Mar. 18, 1999, entitled "System and Method for Installing System Manufacturer Provided Software," naming Anil Rao and Wayne Weilnau as inventors. The co-pending application is incorporated herein by reference in its entirety, and is assigned to the assignee of the present invention.

This application relates to co-pending U.S. patent application Ser. No. 09/315,657, filed on May 19, 1999, entitled "A Method and Apparatus For Windows™-Based Installation For Installing Software on Build-To-Order Computer Systems," naming Bobby G. Doran, Jr., Bill Hyden, and Terry Wayne Liles as inventors. The co-pending application is incorporated herein by reference in its entirety, and is assigned to the assignee of the present invention.

This application relates to co-pending U.S. patent application Ser. No. 09/333,786, filed on Jun. 15, 1999, entitled "Method and Apparatus for Testing Custom-Configured Software/Hardware Integration in a Computer Build-To-Order Manufacturing Process," naming Thomas Vrhel, Jr., Gaston M. Barajas, Paul J. Maia, and W. D. Todd Nix as inventors. The co-pending application is incorporated herein by reference in its entirety, and is assigned to the assignee of the present invention.

TECHNICAL FIELD OF THE INVENTION

The present invention relates in general to computer systems, and, more particularly, to a method and system for installing and testing build-to-order components as part of an image-based software installation in a computer system.

BACKGROUND OF THE INVENTION

A build-to-order (BTO) computer system manufacturing process is driven by menu selection of peripherals, operating system, and application(s). An order for a computer manufactured according to a build-to-order manufacturing process may be placed via an online connection or by telephone. Selections include basic system, RAM, ROM, processor, plug-in cards, operating system (OS), and software applications. A build-to-order manufacturing process is complicated by the large number of possible computer system configurations, and the lack of prior knowledge on the part of the computer system manufacturer as to the configuration to expect from each customer. BTO involves mass configuration/customization where each configuration may be built to an order size of one.

The steps of a build-to-order manufacturing process are: A customer order drives what hardware is to be assembled for a given custom configured computer system. After hardware assembly, the target system is put into a burn rack. In the bum rack, hardware is tested (e.g., using software based tools and utilities) and software downloaded. During software download, the software is layered onto the hard disk drive of the target system. There exist separate software components i) for the OS, ii) for drivers that are specific to plug-in cards and other devices which have been added to a custom configured computer system, and iii) for various applications, which have been ordered with the custom configured computer system.

As discussed, the software components are layered onto the hard drive of the target system in accordance with the customer order. There may be some number of adjustments or modifications that are made to the downloaded software to account for interactions, in certain instances, for use later during OS set-up. For instance, a software driver may support several different plug-in cards and an adjustment to the configuration of the software driver may be required to handle interoperability between components. Upon completion of processing in the burn rack, the custom configured computer system is scanned for viruses, packaged, and shipped to the customer.

Once the computer system is shipped to the customer, if the OS and other applications are not pre-loaded at the time of manufacture of the computer system, the customer must load the OS and applications at the customer site. This process may take between twenty and forty-five minutes. The build-to-order manufacturing process described above, in which a computer system is shipped to the customer for initial set-up by the customer is referred to as the "spray and pray" manufacturing model. That is, the computer manufacturer sprays the bits down onto the hard disk drive and prays that when the customer performs the initial computer system set-up at the customer site, long after the manufacturer has touched the computer system, that the computer system initial set-up works well. The "spray and pray" model is problematic for several reasons. First, during the loading and initialization of the OS and applications by the customer at the customer site, it is not unusual for the customer to turn the system OFF and then ON again, believing that the inactivity of the computer system is an indication that the system is hung. If the computer is powered off during initial installation, the computer system configuration and initial set-up process may be severely affected. In this scenario, additional customer service is necessary and the OS may have to be reloaded by the computer manufacturer to place the system in its pre-shipment state so that the initial set-up process can begin again.

Another difficulty of the "spray and pray" model is that there is not a method for conclusively determining if the set-up will complete properly or has completed properly. There is no check of the hardware and software integrity of the completed system. With this model, the set-up is not complete until the computer system is at the customer site and undergoes the OS set-up. Because each custom built computer system includes a unique configuration, where the components can be different from one system to another, there was no readily available way to verify that everything on a given computer system was installed correctly and working, properly. In such an instance, a customer's action of not calling the manufacturer for technical support was an indication that the OS set-up was successful. In addition, the OS set-up may have completed to a certain level at which the customer didn't recognize that the OS set-up did not completely set up.

Moreover, every single possible combination of computer system configuration (hardware and software) cannot be tested using traditional testing techniques. As discussed, each configuration is an order size of one, with the possibility that each system could be completely different. Testing every possible computer system configuration renders the BTO manufacturing process economically unacceptable and would further unduly lengthen the development process. Rather than test every custom computer system configuration, only a limited number or percentage of the configurations are tested (i.e. those configurations which are high runners). This however results in a very large number of configurations that do not get tested. For instance, the manufacturer may offer ten (10) base systems by ten (10) peripherals, by ten (10) other peripherals, by ten (10) applications, by ten (10) other applications, by ten (10) peripherals, etc. which would, result in too many combinations to test economically and in a timely manner. All of the combinations come together for producing completely unique systems. Thus with a build-to-order manufacturing process, an extremely large number of unique computer system configurations are possible. Furthermore, the set of all possible computer system configurations cannot be tested in the development portion of a build-to-order manufacturing process on an economically and timely basis to ensure that all possible interactions between the various software and hardware components have been identified prior to introduction of a new hardware or software component.

In the prior manufacturing process, tests may have been run to ensure as much as possible that defective component parts would not leave the factory. Components could be individually tested, however, as discussed above, it was not possible to test all configurations of components. A situation might arise, for example, in which a first component A and a second component L were installed in a computer system where the two components needed a common resource but could not share the resource. At the customer site, the two components (A and L) might end up interfering with one another during OS set-up. Independently, each component may have tested acceptable at the factory, however, the components were found to not work together in combination at the customer site. The components were not tested together with the OS that a customer intended to run. Instead, the components were individually tested using software tests, prior to installing the OS on the target system.

In a typical computer system, the OS (e.g., Windows™ 95 (W95), Windows™ 98 (W98), Windows NT™ (NT4 or NT5) from Microsoft Corporation, of Redmond, WA or other OS) requires that at an initial boot (such as, when a customer powers ON the computer system for the very first time), a lengthy process of software installation, hardware detection, and hardware/software configuration be executed. Such a process can take between twenty (20) and forty-five (45) minutes for many custom-configured build-to-order computer systems, and generates considerable user confusion. As previously described, any interruption of this process may result in a system state that cannot be recovered without reinstalling the OS. Reinstalling the OS causes additional frustration for the customer and increases the cost of the computer system through technical support calls and in some instances, replacement of hard disk drives that are not otherwise faulty.

The method of performing initial set-up at a customer site does not allow for a build-to-order computer system manufacturer to fully test the fully integrated hardware and software of a given custom configured computer system prior to the computer system being shipped to a respective customer. In such a method, final integration actually occurs at the customer site.

An alternative to the "spray and pray" model is the defined configuration manufacturing model. The defined configuration manufacturing model involves the manufacture and sale by the computer manufacturer of a limited number of defined computer system configurations. In this model, the computer user cannot order from a large number of possible computer system configurations. Rather, the computer user can order a computer system having a configuration selected from a defined set of computer system configurations. The defined configuration manufacturing model may be effective when the needs of potential computer users are known or may be readily predicted. The defined configuration manufacturing model also permits the computer manufacturer to perform an extensive test on each defined computer system configuration. In this manufacturing model, each configuration has been tested to make certain that there is complete hardware and software integrity for each defined configuration. Thus, there is not a concern that the configuration of hardware and software in the computer system will not function properly when the system is installed at the customer's site. Rather, the particular configuration of software and hardware components has been thoroughly tested by the manufacturer to insure that the computer system functions properly.

Once a configuration of hardware and software components has been defined and has been thoroughly tested to determine that it functions properly, computer systems can be manufactured that have an exact copy of the defined and tested configuration. Each computer will contain the specific hardware and software elements of the approved configuration. With regard to software elements, the hard drive of each computer system will have a precise copy of the installed operating system and software applications. According to this manufacturing model, a first computer system having the defined configuration is booted and taken through initial set-up. An image of the hard drive following initial set-up is captured. This captured image is then copied on to each hard drive of each computer system having the defined configuration. In this manner, each computer system having the defined configuration has a software and hardware configuration that has been pre-tested, and the software has been preinstalled.

A critical drawback of the defined configuration manufacturing model is the unavailability of adding customized hardware and software components to the computer system at the time of manufacture. This drawback of the defined configuration manufacturing model is magnified by the fact that many defined configuration computer systems do not include a floppy drive. Rather, these systems rely on a CD-ROM drive and an Internet or network connections for transferring files and information. Without a floppy drive, it is more difficult for a manufacturer to load additional software applications or software drivers in a defined configuration computer system.

Moreover, permitting the user to request the addition of additional hardware or software components to the system defeats many of the benefits of the defined configuration model and introduces many of the attributes of the build-to-order manufacturing model. Once the computer manufacturer adds an additional component to a defined configuration computer system, the hardware and software integrity of the defined configuration computer system is lost. Because of the addition of the component, the configuration of the computer system is changed, and it is no longer certain that the software and hardware of the computer system will function properly. To maintain the software and hardware integrity of a defined configuration system, each possible addition to the defined configuration system would require additional testing to make certain that each possible addition or change to the defined configuration system results in a computer system that functions properly. The testing of all possible changes to the defined configuration would not be economical and would likely be time-consuming as each newly developed software and hardware component must be tested against each known configuration of the computer system. The additional testing required by each possible change to the configuration of the defined configuration system defeats the purposes of the defined configuration manufacturing model, in which a limited number of pre-tested, easily manufactured configurations are available to the computer user.

It would be desirable to provide a defined configuration manufacturing process in which additions or changes to the ordered computer system could be accommodated in a way that realizes many of the benefits of the build-to-order manufacturing model without sacrificing the testing integrity of the defined configuration computer systems of the defined configuration manufacturing model.

SUMMARY OF THE INVENTION

In view of the difficulties of the defined configuration manufacturing model, a need has arisen for a manufacturing method and system that allows for customization of the computer system without sacrificing the hardware and software integrity of the computer system. In the manufacturing process of the present invention, a customer may order a computer system having one of several defined configurations. The several defined configurations identify the hardware and software components of computer system that may be ordered by a customer. The customer may also specify the additional or custom components that are to be added to the base configuration of the computer system. The additional hardware components are installed in the computer system. The computer system establishes a network connection for downloading to the hard drive of the computer system the base software and the custom software for the computer system. Once downloaded, the base software is in a fully configured and installed state. After the custom software is downloaded and installed, the computer system is put through a test procedure to test the individual hardware and software components of the computer system and to evaluate the degree of integration between the components of the base configuration and the custom components that have been added to the system by the customer's order. Following a successful test, the test software and some portions of the networking software are removed from the computer system.

A technical advantage of the manufacturing system of the present invention is that the computer manufacturer is able to offer to its customers the ability to customize a pre-tested and predefined computer system. The nianufacturing process of the present invention permits the manufacturer to extensively pre-test the base configuration of the computer system, and, after installing the custom components ordered by the user, test the integration of the custom components and the components of the base or defined configuration. In this manner, the computer manufacturer is able to manufacture computer systems that have a pre-tested base configuration, while allowing the user to add custom components, which are then tested by the manufacturer to ensure integration between all components of the computer system.

Another advantage of the manufacturing system described herein is the ability of the computer system being manufactured to access a data record from a computer network and to download the software for the computer system from the computer network. The data record identifies the hardware and software components to be installed in the system. The software that is downloaded to the hard drive of the computer system will include the software of the defined configuration and the software necessary for the custom software components and the custom hardware components ordered by the user.

Still another advantage of the manufacturing process described herein is a manufacturing process in which the test software and portions of the networking software are removed from the computer system prior to shipment to the customer. The computer system manufacturer is able to take advantage of the processing capabilities of the computer system being manufactured to download the software of the computer system and to test the computer system. Following these steps, the test software and portions of the networking software are removed from the computer system and the operating system is sealed so that the system reaches the user in a state that does not reflect the processing that occurred at the time of manufacture.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
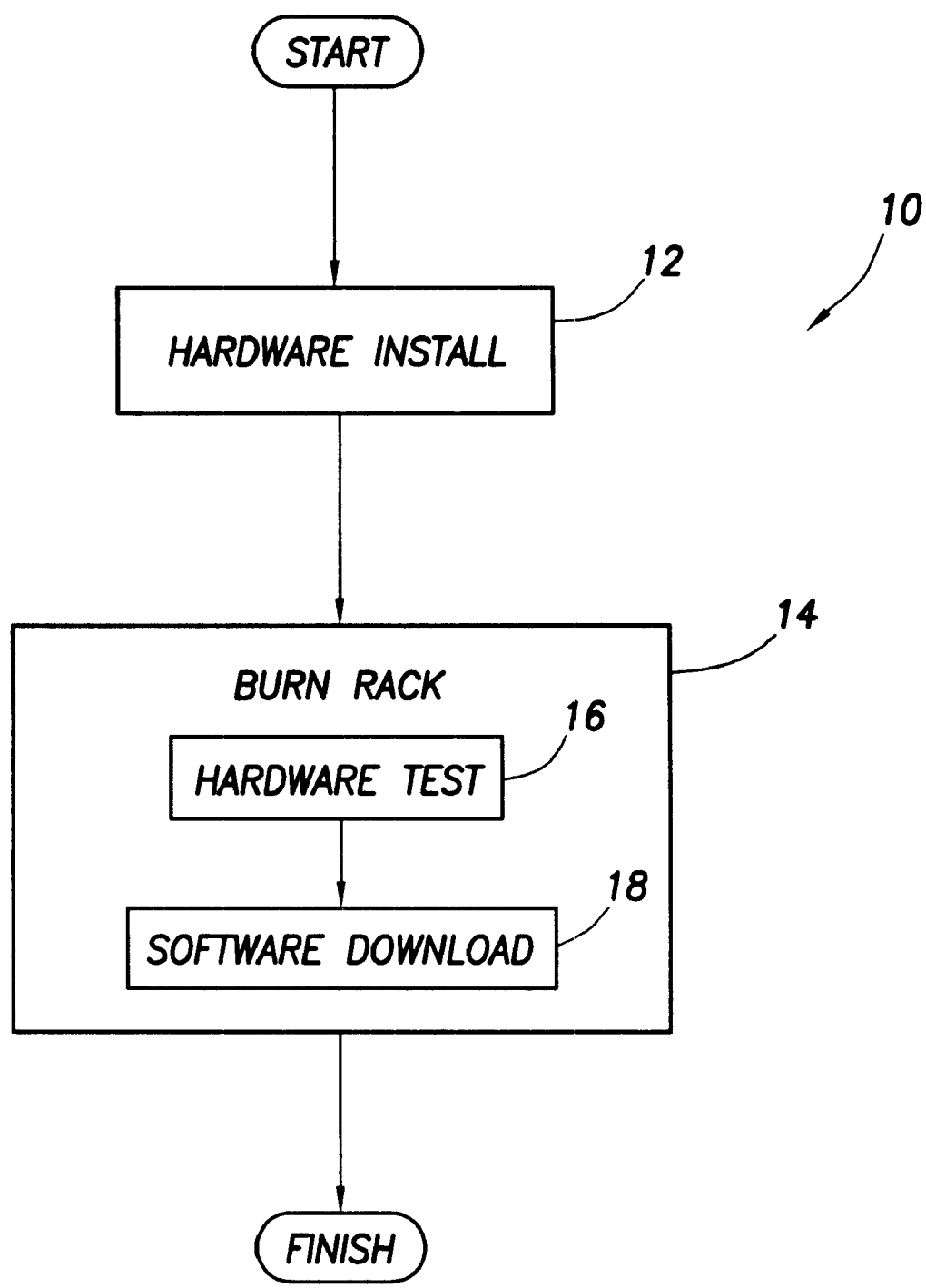
FIG. 1 is a flow diagram for a build-to-order manufacturing process.
Figure 2:
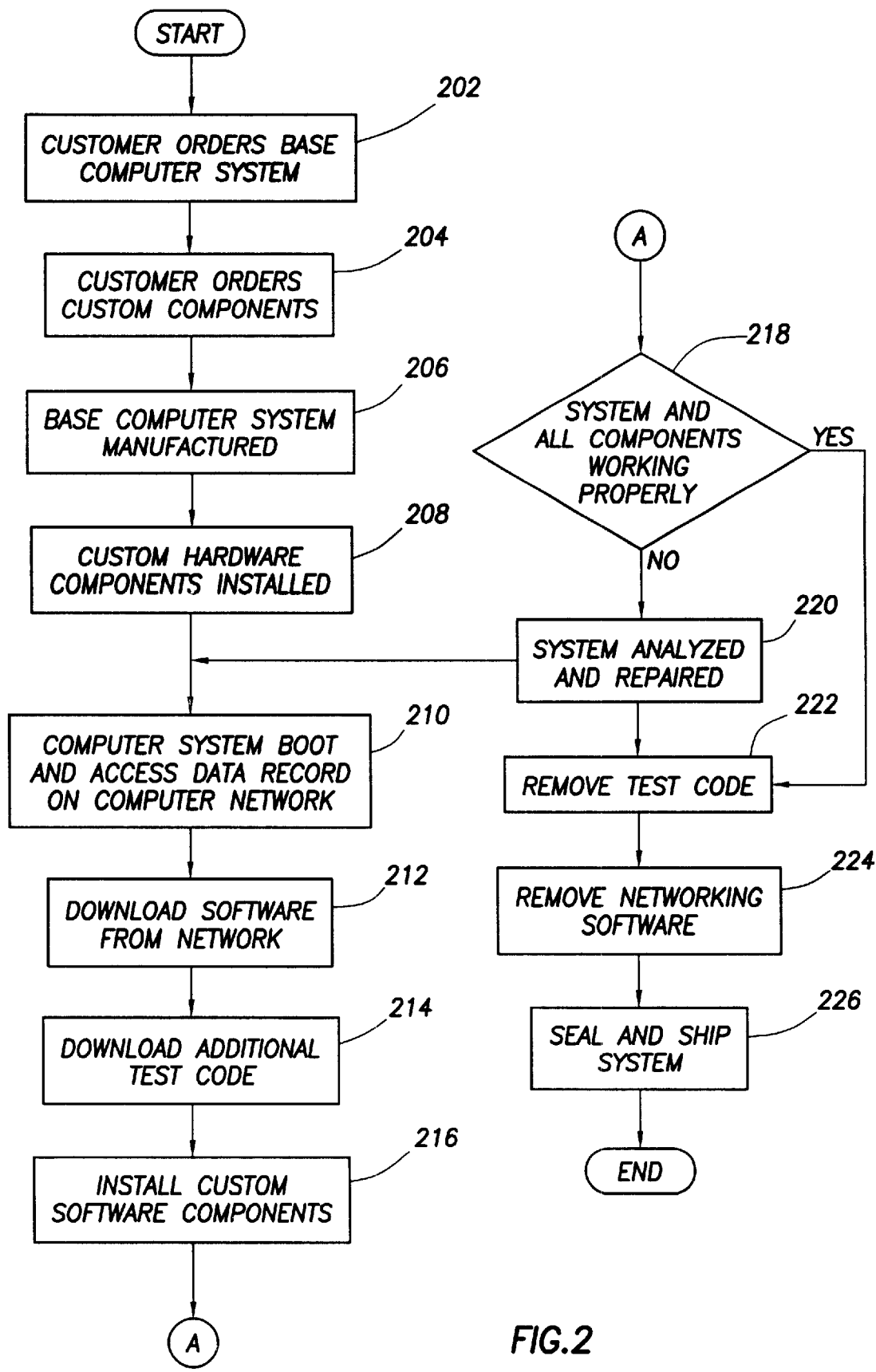
FIG. 2 is a flow diagram for a computer system manufacturing process.

The present invention includes a process for adding custom hardware and software components to a defined configuration computer system. FIG. 2 is a flow diagram of the manufacturing and testing process of the present invention. At step 202, the customer orders a computer system of one of several defined configurations. The defined configuration of the computer system ordered by the customer will specify the operating system, software applications, memory capacity, and peripheral components of the system. Each defined configuration is unique and there may be six or fewer defined configurations for a family of computer systems having a given microprocessor, model, or price range. The customer order process may involve an order that is placed directly with the manufacturer, including orders that are placed by telephone or over the Internet or another online medium.

Each defined configuration computer system is pre-tested by the computer manufacturer. As such, the computer manufacturer is certain that the defined configuration of software and hardware components in each defined configuration computer system will function properly, assuming that no defects exist in the individual hardware components of the defined configuration computer system. At step 204, the customer is provided the opportunity to customize the defined configuration of the computer system. As part of this step of the manufacturing process, the user may specify in its order that additional hardware or software components be added to the defined configuration of the computer system. As an example, the user may specify that a DVD player be added to the system. As a second example, the user could also specify that a particular software application be added by the computer manufacturer to the computer system. Each of these additions alters the defined configuration of the computer system. Because the customer's order will modify the defined configuration of the computer system, the hardware and software integrity of the system is lost. As such, the computer system can no longer be considered pre-tested and there is no certainty, even assuming that no errors are present in the functionality of the individual hardware components, that the system will function properly once manufactured.

At step 206 of FIG. 2, a computer system having the hardware components of the defined or base configuration is manufactured. The hardware components that comprise the defined configuration, including the specified hard drive and all peripheral components, are installed in the computer system. Following the installation of the hardware components of the defined configuration at step 206, the custom hardware components of the computer system are installed at step 208.

At step 210, following the manufacture of the base computer system and installation of the custom hardware components, the computer manufacturer boots the computer and accesses a data record that is maintained on a database that is accessible through a network connection between the computer system and a network administered by the computer manufacturer. The data record may reside at a database accessible through a local network connection. The data record will contain the details of the customer's order, including an identification of all hardware and software components to be installed in the computer system.

To access the computer network, the computer manufacturer must boot the computer system and run network connection software. The computer system can boot and run the necessary software from a floppy drive, CD-ROM drive, or other local external media drive of the computer system. Once the computer system has booted from software loaded to a local external media drive, the computer system will access the computer network, and read the data record. After the data record has been read, the computer system may download at step 212 the defined configuration software and custom software specified by the data record to be installed in the computer system. As an option to downloading the entirety of the defined configuration software and the custom software following a boot and network connection driven by software loaded to a local external media drive, the computer system may boot from the local software and download only the software of the defined configuration. The computer system may then boot from the defined configuration software on the hard drive of the computer system, access the computer network using the networking software of the defined configuration software, read the data record, and download the custom software specified by the data record to the hard drive of the computer system. Either of the approaches of step 212 outlined above for booting the computer system for access to the computer network following installation of the defined configuration hardware and custom hardware is acceptable. Preference for one approach over another may depend upon whether network connection software is included in the defined configuration software.

The custom software downloaded at step 212 includes any software, like software drivers, necessary for the operation of custom hardware components installed at step 208. The defined configuration software and any custom software are available to be downloaded through the computer network that was accessed by the computer system at step 210. At step 212, the computer system downloads the defined configuration software and custom software specified in the data record to the hard drive of the computer system. At step 214, the computer system downloads from the computer network additional test code for testing the custom hardware components and custom software components. This additional test code is necessary for testing the custom hardware and software components themselves and for testing the interoperability of these components and the hardware and software components of the defined configuration.

With respect to the installation of the software components of the defined configuration, the software of the computer system is installed according to an image-based installation process. An image-based installation process involves downloading to the hard drive a defined set of software, including all applications, drivers, and other support files. The defined configuration software that is downloaded to the hard drive is in a fully set-up and configured state. No installation or additional set-up is required of the software of the defined configuration once the defined configuration software is downloaded to the hard drive. An exact copy or image of the defined configuration software is downloaded to and is present on the hard drive of each computer system that has the defined configuration. The software of the defined configuration is fully installed and set-up upon being downloaded to the hard drive. No other installation steps are necessary. Thus, in the absence of custom hardware components or software components in the computer system, the defined configuration software would be fully operational upon being powered up.

The custom software will be in the form of a software application, a software driver, or any other software elements that are either specified by the customer or are necessary for the operation of the hardware ordered by the customer. By way of example, if a customer orders a DVD player as a custom addition to the defined configuration of the computer system, the computer manufacturer will install the DVD hardware and will download the software driver for the DVD player from the network to the hard drive of the computer system. The DVD hardware installation and the DVD software download will occur as part of the manufacturing process. If a software application, such as an office productivity application, is ordered by the customer as a custom addition to the defined configuration of the computer system, the software application is likewise downloaded from the network to the hard drive of the computer system.

At step 216, the downloaded custom software components must be installed in the computer system. In contrast with the existing software of the defined configuration, which was downloaded to the computer system as part of an image-based installation of the hard drive of the computer system, many of the downloaded software elements must go through an initial set-up procedure to be fully functional. This set-up or installation procedure is often accomplished by rebooting the system. Rebooting the system is often required for the installation of software drivers. Depending on the individual requirements of the specific downloaded software applications, an initial set-up procedure may have to be run, followed by a rebooting of the computer system.

Once the additional hardware and additional software have been installed, the computer system must be tested at step 218. Testing at this stage of the manufacturing process is necessary because the software and hardware integrity of the defined configuration computer system is lost. Software and hardware integrity is no longer present in the computer system because components other than the components of the defined configuration are now present in the computer system. Thus, the software and hardware components of the computer system must be tested following the installation of the custom hardware and software components to make certain that the components of the computer system function properly. The testing process of step 218 is known as an Enhanced Fully Integrated System Test (EFIST).

The EFIST process involves the execution of a software program or module that investigates problem and status codes to determine if any piece of hardware is not fully functional. The EFIST software program comes from two sources. First, test code for testing the defined configuration hardware and software components resides on the hard drive as part of the download of the defined configuration software at step 212. The second source of EFIST test code is the additional test code that was downloaded from the network at step 214. This additional test code is necessary for the testing of the custom hardware components and software components that have been installed in the computer system.

The EFIST software program or module checks the level of hardware and software integration that has occurred as a result of the addition of the custom software and hardware components to determine that all hardware as specified in the customer order is installed in the computer system. In addition to ensuring that all the hardware-related software components are installed properly and functional, the EFIST process will also identify any missing hardware. To do this, the EFIST process compares the elements in the given computer system to the elements in a respective customer order or data record that was read from the computer network in step 210. The EFIST process also identifies any additional hardware that was mistakenly installed but not specified in the respective customer order.

As a result of the EFIST process, the status of the custom configuration ordered by the customer can be checked to ensure that all hardware elements have been properly recognized by the OS and are properly configured and operational, per the particular OS of the given computer system. The EFIST process further enables the detection of additional hardware, if any, that may have been installed but was not part of the customer order. The EFIST process also determines if each installed hardware component is functioning properly. Despite the predictability of an image-based software installation process, until testing occurs, it is not known whether the individual hardware components are fully operational. At step 218, it is determined whether the EFIST process completed successfully. If the computer system and all components did not test successfully, the computer system is removed from the assembly process in step 220, and analyzed by a service or repair technician within the manufacturing plant in accordance with errors uncovered by the EFIST process. Corrective action is taken, as appropriate. Once the system problem has been corrected, the manufacturing process may continue with the step of booting the computer system and accessing the data record on the computer network at step 212. It should be noted that the manufacturing process may continue from another point in the manufacturing process of FIG. 2, depending on the status of the computer system following the correction of the system problem.

The software program of the EFIST process tests the hardware and software integration of the computer system to ensure that the operating system has not detected any conflicts or faults. In addition, the EFIST process also checks the hardware as specified in the customer order against the hardware present in the computer system as built. The EFIST process will also determine that the proper software driver has been installed for each hardware component.

After completion of the EFIST process, the files comprising the EFIST software are removed from the computer system at step 222. Because the files comprising the EFIST process are no longer needed, the files may be erased from the computer system. In addition, some elements of the networking software of the computer system may be deleted or uninstalled at step 224. Some portions of the networking software will be specific to the network of the computer system and computer manufacturer. These elements of the networking software are removed or uninstalled from the computer system so that the networking software will correctly respond to and work in the customer's networking environment once the computer system reaches the customer. At step 226, the operating system is resealed and the computer system is shipped to the customer. Resealing of the operating system is necessary for customer licensing purposes, as well as to provide the customer with an opportunity to configure the operating system at the customer's site during an abbreviated initial set-up procedure at the customer site.

The manufacturing steps described above provide the computer manufacturer with a manufacturing process that incorporates the elements of a build-to-order manufacturing process into a defined configuration manufacturing process. As such, computer systems having base or defined configurations can be customized to fit the needs of a user. The customized systems can be readily and quickly manufactured and tested. The installation process described retains many of the benefits of the defined configuration installation process in that computer systems having a pretested, defined configuration of components may be quickly and repeatedly manufactured. By incorporating build-to-order concepts, these same computers may be quickly and easily customized to meet the user's preferences. The customization occurs by accessing a data record that identifies the customization requested by the customer. The custom components can then be installed on the system and the system may be tested using software that was added to the system as part of the installation of the custom components. The manufacturing process described herein takes advantage of the simplicity of the defined configuration manufacturing model and the flexibility of the build-to-order manufacturing model, without sacrificing the hardware and software integrity required of each manufacturing model.

Although the present invention has been described in detail, it should be understood that various changes, substitutions, and alterations can be made thereto without departing from the spirit and scope of the invention as defined by the appended claims.

What is claimed is:

1. A method for manufacturing a computer system, comprising the steps of:

obtaining a customer order for a computer system having a defined configuration of components;

obtaining a customer order for the addition of a custom component to the defined configuration of the computer system;

manufacturing the computer system according the defined configuration;

adding the custom component to the computer system;

performing a system test of the computer system to evaluate the functionality and integration of the components of the defined configuration and the custom component.

2. The method for manufacturing a computer system of claim 1, wherein the custom component is a custom software component, and wherein the step of adding the custom software component to the computer system comprises the steps of, accessing a computer network;

retrieving a data record from a database on the computer network, the data record identifying the custom software component to be added to the computer system;

downloading the custom software component to the computer system; and installing the custom software component on the computer system.

3. The method of manufacturing a computer system of claim 2, further comprising the step of downloading from the computer network test software for testing the custom software component of the computer system.

4. The method for manufacturing a computer system of claim 3, further comprising the step of removing the test software from the computer system.

5. The method for manufacturing a computer system of claim 4, further comprising the step of removing from the computer system networking software configured to couple the computer system to the computer network.

6. The method for manufacturing a computer system of claim 5, further comprising the step of sealing the operating system of the computer system for shipment.

7. The method for manufacturing a computer system of claim 1, wherein the custom component is a custom hardware component; and wherein the step of adding the custom hardware component to the computer system comprises the steps of, installing the custom hardware component in the computer system;

accessing a computer network;

retrieving a data record from a database on the computer network, the data record identifying the custom hardware component to be added to the computer system; and downloading from the computer network any software necessary for the installation or operation of the custom hardware component.

8. The method for manufacturing a computer system of claim 7, further comprising the step of downloading from the computer network test software necessary for testing the custom hardware component of the computer system.

9. The method for performing diagnostic services of claim 8, further comprising the step of removing the test software from the computer system.

10. The method for manufacturing a computer system of claim 9, further comprising the step of removing from the computer system networking software configured to couple the computer system to the computer network.

11. The method for performing diagnostic services of claim 10, further comprising the step of sealing the operating system of the computer system for shipment.

12. A method for manufacturing a computer system having user-specified components and a base configuration of hardware and software components, comprising the steps of:

receiving a customer order for a computer system having a base configuration of hardware and software components;

receiving a customer order for a custom component to be installed in the computer system;

assembling a computer system having the base configuration of hardware and software components;

installing the custom component;

accessing a data record maintained on a computer network from the computer system, the data record including an identification of the custom component to be installed in the computer system;

receiving at the computer system from a location on the computer network test software for testing the custom component;

testing the custom component; and removing the test software from the computer system.

13. The method for manufacturing a computer system of claim 12, wherein the step of installing a custom component comprises the step of installing a custom hardware component.

14. The method for manufacturing a computer system of claim 12, further comprising the step of downloading from the computer network to the hard drive of the computer system an image of the software of the base configuration of the computer system.

15. The method for manufacturing a computer system of claim 14, further comprising the step of removing from the computer system software that is applicable to the network connection between the computer system and the computer network.

16. The method for manufacturing a computer system of claim 15, further comprising the step of sealing the operating system of the computer system for shipment.

17. A computer system, comprising:

a processor;

a memory;

a storage device, the computer system having been manufactured in accordance with a manufacturing process in which a custom software or hardware component is added to a computer system having a base configuration of defined hardware and software components, the custom component being identified via access to a computer network, any additional software necessary for the installation of the custom component being downloaded from the computer network, the computer system having been tested following installation of the custom component to evaluate the functionality of the computer and the integrity of the combination of the components of the base configuration and the custom component.

18. The computer system of claim 17, wherein the software downloaded from the computer network includes test software for testing the custom component.

19. The computer system of claim 18, wherein software operable for the testing of the computer system having been deleted from the computer system following a successful test of the computer system.

20. The computer system of claim 17, wherein the software downloaded from the computer network includes networking software for accessing the computer network.

21. The computer network of claim 20, wherein software operable for connecting the computer system to the computer network having been deleted from the computer system following a successful test of the computer system.

22. A method for manufacturing a computer system having user-specified components and a base configuration of hardware and software components, comprising the steps of:

receiving a customer order for a computer system having a base configuration of hardware and software components;

receiving a customer order for a custom component to be installed in the computer system;

assembling a computer system having the base configuration of hardware and software components;

installing the custom component;

booting the computer system from local software loaded to a local external media drive;

accessing a computer network from the local software;

reading a data record maintained on a computer network, the data record including an identification of the custom component to be installed in the computer system;

receiving at the computer system from a location on the computer network test software for testing the custom component;

testing the custom component; and removing the test software from the computer system.

23. The method for manufacturing a computer system of claim 22, wherein the step of installing a custom component comprises the step of installing a custom hardware component.

24. The method for manufacturing a computer system of claim 22, further comprising the step of removing from the computer system software that is applicable to the network connection between the computer system and the computer network.

25. The method for manufacturing a computer system of claim 24, further comprising the step of sealing the operating system of the computer system for shipment.

26. A method for manufacturing a computer system having user-specified components and a base configuration of hardware and, software components, comprising the steps of:

receiving a customer order for a computer system having a base configuration of hardware and software components;

receiving a customer order for a custom component to be installed in the computer system;

assembling a computer system having the base configuration of hardware and software components;

installing the custom component;

booting the computer system from local software loaded to a local external media drive;

accessing a computer network from the local software;

downloading from the computer network the software components of the base configuration;

reading a data record maintained on a computer network, the data record including an identification of the custom component to be installed in the computer system;

downloading from the computer network custom software necessary for the operation of the custom component.

receiving at the computer system from a location on the computer network test software for testing the custom component;

testing the custom component;

removing the test software from the computer system;

removing networking software from the computer system; and sealing the computer system for shipment.

27. A method for manufacturing a computer system having user-specified components and a base configuration of hardware and software components, comprising the steps of:

receiving a customer order for a computer system having a base configuration of hardware and software components;

receiving a customer order for a custom component to be installed in the computer system;

assembling a computer system having the base configuration of hardware and software components;

booting the computer system from local software loaded to a local external media drive;

accessing a computer network from the local software;

reading a data record maintained on a computer network, the data record including an identification of the custom component to be installed in the computer system;

installing the custom component, receiving at the computer system from a location on the computer network test software for testing the custom component;

testing the custom component, and removing the test software from the computer system.

28. The method for manufacturing a computer system of claim 27, wherein the step of installing a custom component comprises the step of installing a custom hardware component.

29. The method for manufacturing a computer system of claim 27, further comprising the step of removing from the computer system software that is applicable to the network connection between the computer system and the computer network.

30. The method for manufacturing a computer system of claim 29, further comprising the step of stealing the operating system of the computer system for shipment.

* * * * *